United States Patent
Siimes et al.

(10) Patent No.: US 6,955,182 B2
(45) Date of Patent: Oct. 18, 2005

(54) TAMPER PROOF RELIEF VALVE FOR GAS CYLINDER

(76) Inventors: Thomas S. Siimes, 524 Jarvis Street, Windsor, Ontario (CA) N8P 1C9; Timo Siimes, 1187 Jarvis Street, Windor, Ontario (CA) N8P 1C8

(*) Notice: Subject to any disclaimer, the term of this patent is extended or adjusted under 35 U.S.C. 154(b) by 186 days.

(21) Appl. No.: 10/342,753

(22) Filed: Jan. 15, 2003

(65) Prior Publication Data

US 2003/0155005 A1   Aug. 21, 2003

Related U.S. Application Data

(60) Provisional application No. 60/349,122, filed on Jan. 16, 2002.

(51) Int. Cl.$^7$ ............................................. F16K 17/16
(52) U.S. Cl. .................................. 137/68.23; 220/89.2
(58) Field of Search ........................ 137/68.19, 68.23; 220/89.2

(56) References Cited

U.S. PATENT DOCUMENTS

| 1,606,831 | A | * | 11/1926 | Ford | ........................ | 220/89.2 |
|---|---|---|---|---|---|---|
| 2,178,686 | A | * | 11/1939 | Georgiev | .................... | 220/89.2 |
| 2,487,104 | A | * | 11/1949 | Cooper | ...................... | 220/89.2 |
| 2,582,171 | A | * | 1/1952 | Simpson | ..................... | 220/89.2 |
| 2,691,459 | A | * | 10/1954 | Whitmore | ................ | 137/68.13 |
| 2,701,075 | A | * | 2/1955 | Coffman | .................. | 137/68.25 |
| 2,958,184 | A | * | 11/1960 | Sanders | ..................... | 220/89.2 |
| 3,064,854 | A | * | 11/1962 | Miller | ........................ | 220/89.2 |
| 3,228,334 | A | * | 1/1966 | Oss | ............................. | 220/89.2 |
| 3,356,257 | A | * | 12/1967 | Eimer | ........................ | 220/89.2 |
| 4,142,940 | A | * | 3/1979 | Modolell et al. | .......... | 220/89.2 |

* cited by examiner

*Primary Examiner*—John Rivell
(74) *Attorney, Agent, or Firm*—Carlson, Gaskey & Olds

(57) ABSTRACT

A relief valve includes an outlet and a cavity with a barb formed on an inner surface. An insert pressed into the cavity includes an inlet in communication with the contents of a pressurized container. A frangible member is trapped within the cavity by the insert and separates the inlet and outlet. The insert defines an area of pressure acting on the frangible member from the pressurized container. The frangible member bursts in response to a desired pressure within the pressurized container. The insert is fabricated from a plastic material with a high resistance to plastic deformation. The insert is held within the cavity by a plurality of barbs that prevent removal. Removal of the insert is only possible by destroying the insert, thereby evidencing modification.

14 Claims, 3 Drawing Sheets

TAMPER PROOF RELIEF VALVE FOR GAS CYLINDER

This application claims priority to the provisional application Ser. No. 60/349,122, filed on Jan. 16, 2002.

BACKGROUND OF THE INVENTION

This application relates to a relief valve for a pressurized container, and specifically to a relief valve including a frangible member rupturable in response to predetermined pressure and having modification prevention features.

Typically, a pressurized container or cylinder is filled with a gas or a liquid gas mixture under a predetermined pressure. Each container is designed and built to withstand a predetermined pressure under a standard set of conditions. Accordingly, a relief valve is included with the container that opens when pressure increases above the predetermined pressure. The relief valve prevents over pressurization and thereby failure of the container. Increases in pressure within the container results from overfilling or from exposure to a heat source. In each instance, the relief valve opens a passageway to release gas from the container and prevent bursting.

Some users incorrectly equate added pressure with added power, speed, etc. . . . and purposefully attempt to over pressurize the container. The standard relief valve will prevent this unless tampered with and modified to allow over pressurization. Tampering with a relief valve to allow over pressurization of a pressurized container or cylinder used by consumers, such as for paint ball guns, can result in injury. For this reason, known relief valves are constructed such that after bursting a new relief valve is required.

However, some users modify the relief valve to allow increased pressure within a gas cylinder. The modified relief valve allows the gas pressure within the gas cylinder to be increased substantially beyond the rated or predetermined pressure. This presents a very dangerous condition for the user. It is therefore desirable to design a relief valve that is tamper proof and tamper evident such that any unauthorized modification of the relief valve can be detected to evidence misuse by the user and render the relief valve inoperable to prevent use of the pressurized container.

Typically, relief valves are constructed as a threaded member installed into the gas cylinder or components assembled thereon. The relief valve includes a frangible member that will open the interior of the gas cylinder to atmosphere upon bursting.

Typically, the frangible member is fabricated from a frangible material such as copper. The thickness of the material corresponds to a pressure at which the relief valve is to open. As appreciated, the area exposed to gas at a pressure, and the thickness of the frangible member act in concert to determine the relief pressure for a specific gas cylinder. If the pressure within the gas cylinder increases beyond the relief pressure, the frangible member will rupture and allow gas to escape to atmosphere.

Tampering with or changing the dimensions of the frangible member will change the amount of pressure required to blow the relief valve. It is known to crimp a frangible member to a threaded member to prevent and evidence unauthorized modification of the relief valve. However, often times crimping of the frangible member is not sufficient to prevent removal with simple tools.

Accordingly, it is therefore desirable to develop a relief valve that prevents tampering, and will evidence attempts at modification.

SUMMARY OF THE INVENTION

The invention is a relief valve for a pressurized container includes a frangible member secured within a cavity by an insert held within the cavity by at least one barb.

The relief valve includes an outlet and a cavity with a barb formed on an inner surface. An insert pressed into the cavity includes an inlet in communication with the contents of the gas cylinder. A frangible member is secured within the cavity by the insert and separates the inlet from the outlet. The insert traps the frangible member against a shoulder defined within the cavity. The inlet through the insert defines an area of pressure acting on the frangible member. Pressure is communicated from the cylinder against the frangible member. A thickness of the frangible member in concert with the area defined by the dimensions of the inlet determine the pressure required to burst the frangible member and release pressure from the gas cylinder.

The insert is fabricated from a plastic material with a high resistance to plastic deformation such as Delrin. The cavity includes at least one locking barb configured to prevent removal of the insert. The locking barb prevents removal of the insert. Removal is possible only by destroying the insert.

Accordingly, this invention provides a relief valve for releasing pressures exceeding a desired pressure, and prevents or evidences tampering by users.

DETAILED DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
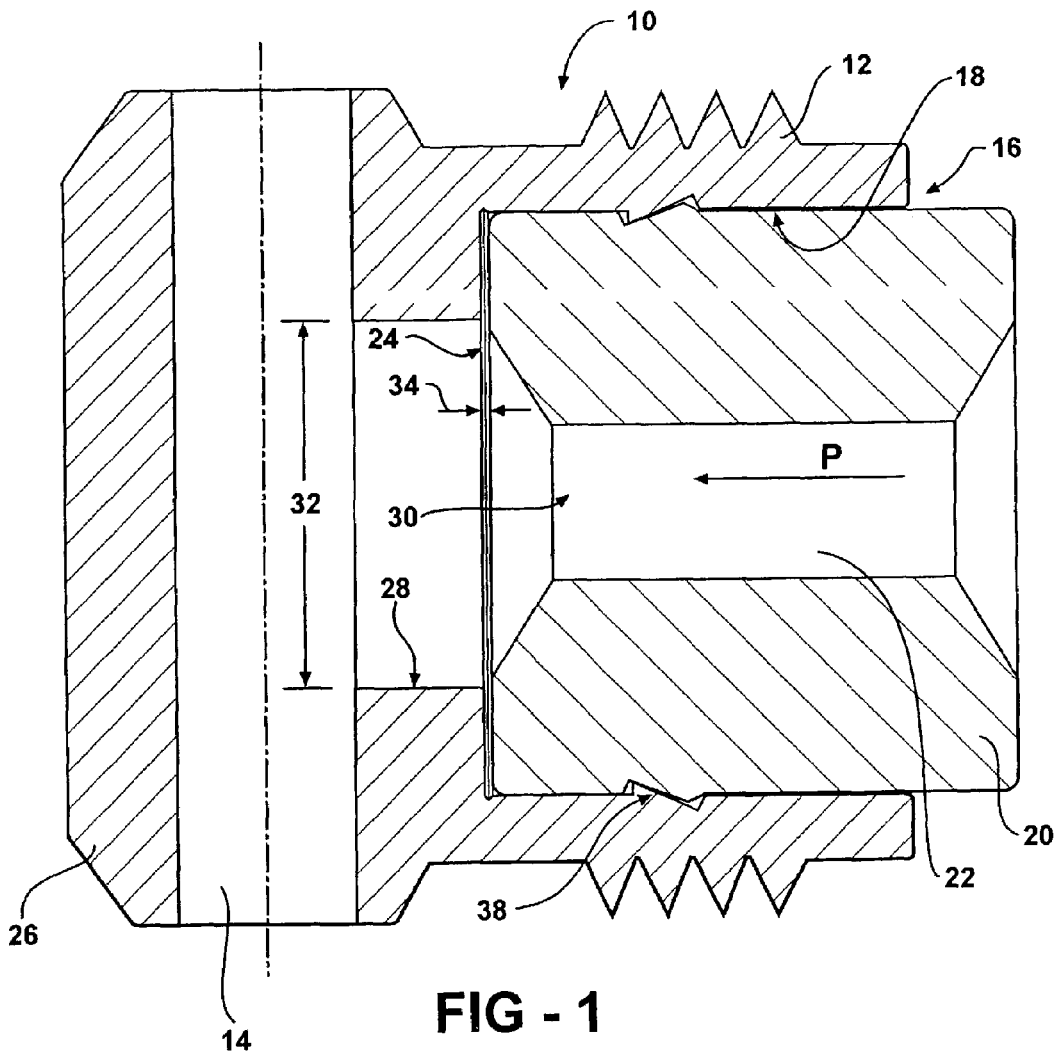
FIG. 1 is cross-sectional view of a relief valve.
Figure 2:
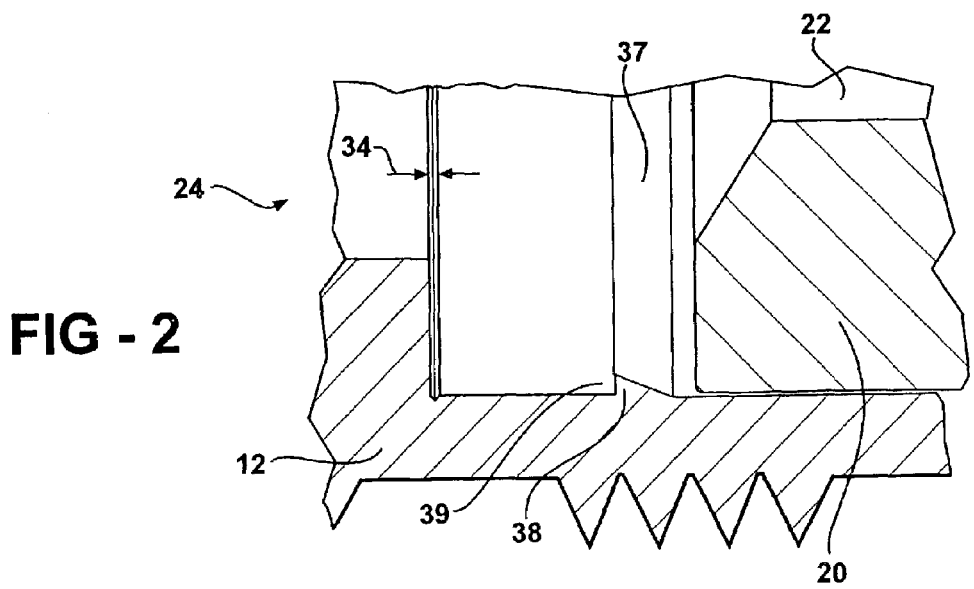
FIG. 2 is an enlarged cross-sectional view of the relief valve with an insert partially received within a cavity.
Figure 3:
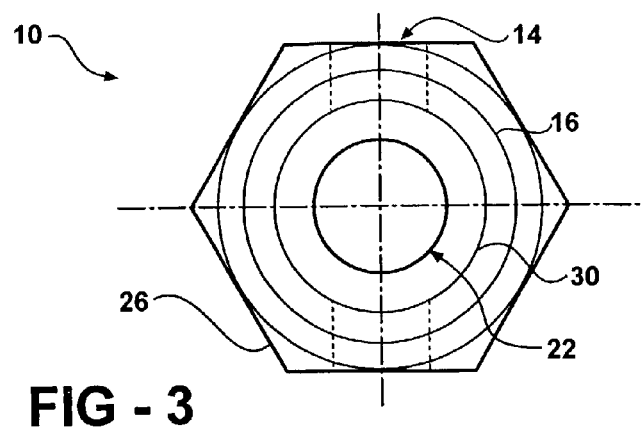
FIG. 3 is top plan view of the relief valve.

Referring to FIGS. 1, 2 and 3, a relief valve is generally indicated at 10 and includes a threaded member 12 defining a outlet 14 and a cavity 16 having inner walls 18. An insert 20 pressed into the cavity 16 defines an inlet 22. A frangible member 24 is secured within the threaded member 12 by the insert 20 and separates the inlet and outlet 14,22. Although, a threaded member 12 is shown, it is within the scope of this invention to use other known fastening configurations, such as press fits or locking grooves. The inlet and outlet 14,22 are disposed perpendicular to each other with the inlet 22 extending through a head portion 26 of the threaded member 12. Preferably, the head portion 26 includes a hexagonal shape to cooperate with typical fastening tools.

The insert 20 includes the inlet 22 and is pressed into the cavity 16 of the threaded member 12. The insert 20 traps the frangible member 24 against a shoulder 28 defined at one end of the cavity 16. The inlet 22 through the insert is of a dimension that defines the area of pressure acting on the frangible member 24. Preferably, the insert 20 includes a concave opening 30 on each end with a diameter 32 larger than that of the inlet 22. The larger diameter 32 of the concave opening 30 defines the area over which pressure within the gas cylinder (not shown) will act on the frangible member 24. Further, the concave openings 30 are disposed on each end of the insert 20 to simplify orientation and assembly of the insert 20 to the cavity 16. The concave opening 30 disposed on an end opposite the frangible member 24 mates to a scaling component (not shown) within a valve mounted to the gas cylinder.

Pressure is communicated from the cylinder against the frangible member 24 in the direction of the arrow "P". The pressure from within the cylinder is communicated through the inlet 22 against the frangible member 24. The thickness 34 of the frangible member 24 in concert with the area defined by the diameter 32 determines the pressure required to burst the frangible member 24 and release pressure from the gas cylinder. A worker knowledgeable in the art would understand how to size the diameter 32 in concert with the thickness 34 of the frangible member 24 such that the frangible member 24 ruptures at a desired gas pressure.

The insert 20 is fabricated from a plastic material with a high resistance to plastic deformation such as Delrin. The cavity 16 includes at least one locking feature to prevent removal of the insert. Preferably, the locking feature comprises at least one locking barb 38 configured to prevent removal of the insert 20. The locking barb 38 prevents removal of the insert 20. Preferably, the locking barb 38 includes a ramped portion 37 and a flat portion 39. The ramped portion 37 is configured to allow insertion of the insert 20 into the cavity 16 in one direction. The flat portion 39 engages the insert 20 and prevents removal by gripping and digging into the insert 20. Preferably, the barb 38 extends about the inner surface 18 of the cavity 16. The barb 38 may also be configured intermittently about the inner surface 18 of the cavity 16.

Removal of the insert 20 is possible only by destroying the insert 20 such that reuse is prevented. A high resistance to plastic deformation of the material used to construct the insert 20 inhibits relaxation of the material over the life of the relief valve 10. Destruction of the insert 20 evidences tampering and renders the relief valve 10 inoperable, because the destroyed insert 20 will not seal adequately against the valve sealing surface or the frangible member 24.

Figure 4:
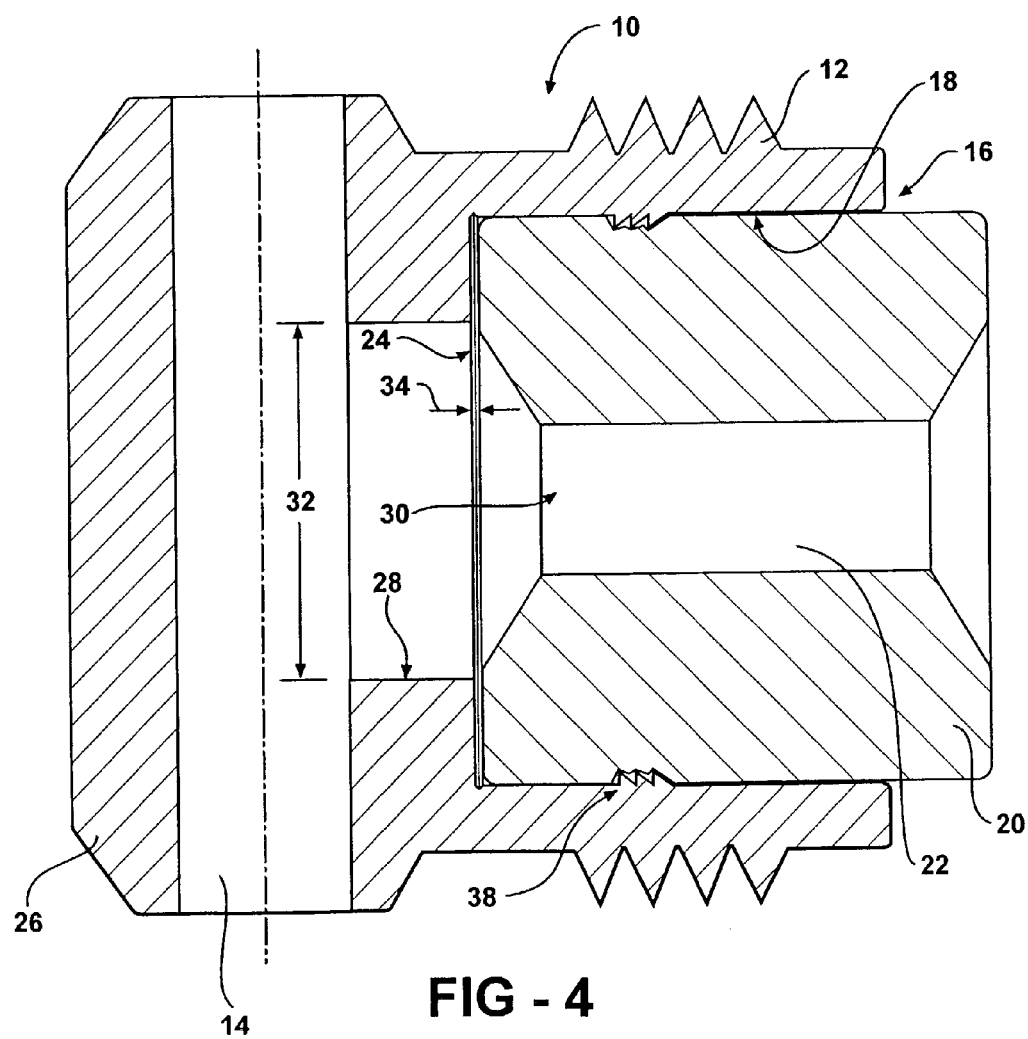
FIG. 4 is a cross-sectional view of another embodiment of a relief valve according to this invention.

Referring to FIG. 4, in another embodiment of this invention a series of locking barbs 38 are provide on the inner walls 18 of the cavity 16 to prevent removal of the insert 20. Only by substantially destroying the insert 20 can the insert 20 be removed from the cavity 16. The substantial damage to the insert 20 serves to evidence tampering of the relief valve 10 and at render the relief valve 10 inoperable to prevent unauthorized over pressurization of the gas cylinder.

Figure 5:
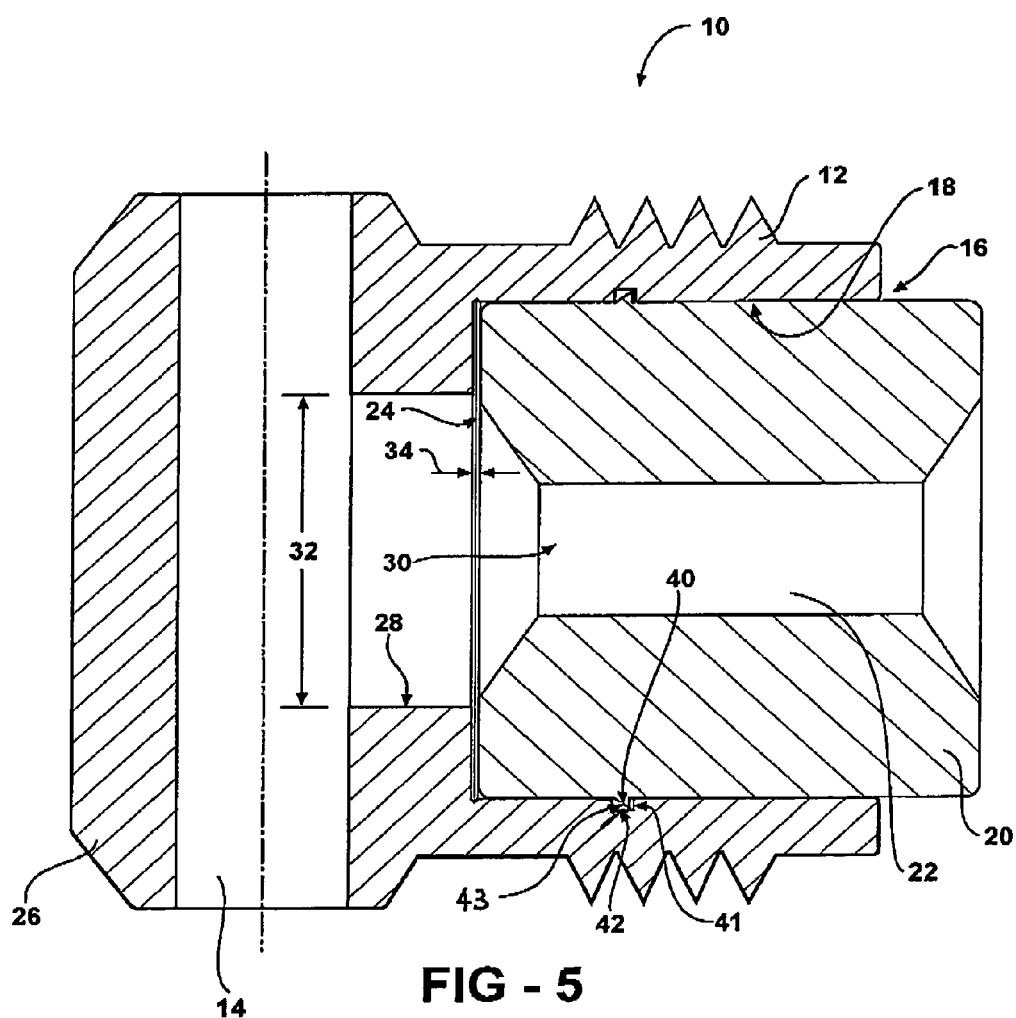
FIG. 5 is a cross-sectional view of yet another embodiment of a relief valve according to this invention.

Referring to FIG. 5, another embodiment of the relief valve 10 is shown including the locking feature on the insert 20. In this embodiment, the locking feature is a locking barb 40 that cooperates with a groove 42 disposed on the inner walls 18 of the cavity 16. The locking barb 40 is formed on the insert 20 and extends about the outer surface of the insert 20. In this way, machining of the threaded member 12 is simplified. The insert 20 is inserted into the cavity 16 to trap the frangible member 24. The insert 20 is pressed into the cavity 16 until the locking barb 40 engages the groove 42.

The groove 42 is positioned within the cavity 16 in a location to provide a desired amount of pressure on the frangible member 24.

The locking barb 40 includes a tapered surface 43 and a flat surface 41. The tapered surface 40 is the forward portion of the locking barb 40 to minimize the force required to assembly the insert 20 into the cavity 16. Once the locking barb 40 locks into the groove 42, the flat surface 41 prevents the locking barb 40 from unlocking and therefore prevents removal of the insert 20. As appreciated, the insert 20 can only be removed by destroying the locking barb 40. Destruction of the locking barb 40 prevents reuse and evidences any attempt at modification of the relief valve 10.

Further, it should be understood that it is within the contemplation of this invention to use any known locking barb configuration feature that would require that the insert 20 be substantially destroyed upon removal.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention.

What is claimed is:

1. A relief valve assembly for a pressurized container comprising:
   a housing defining a cavity and an outlet, said cavity including a barb extending radially inwardly, said barb including a ramped surface and a surface transverse to said cavity;
   an insert secured within said cavity by said barb such that removal is evidenced by damage to said insert, said insert including an inlet passage; and
   a frangible member held against said housing by said insert, said frangible member rupturable in response to a predetermined pressure within said cylinder to allow the contents of said gas cylinder to escape.

2. The assembly of claim 1, wherein said barb is disposed on an inner surface of said cavity.

3. The assembly of claim 2, wherein said barb extends about an inner circumference of said cavity.

4. The assembly of claim 1, including a plurality of barbs disposed on an inner surface of said cavity.

5. The assembly of claim 1, wherein said barb includes a portion transverse to said cavity engaging said insert.

6. The assembly of claim 5, wherein said barb includes a ramped portion tapering away from an inner surface of said cavity and toward said inlet.

7. The assembly of claim 1, wherein said frangible member includes a thickness sized to rupture in response to a predetermined pressure force.

8. The assembly of claim 1, wherein said insert is a plastic material resistant to deformation.

9. The assembly of claim 1, wherein said insert is Delrin.

10. The assembly as recited in claim 1, wherein said insert includes a convex surface on at least one end.

11. A relief valve assembly for a pressurized container comprising:
   a housing defining a cavity and an outlet;
   an insert secured within said cavity by at least one barb, said insert including an inlet passage; and a frangible member disposed between said inlet and outlet, rupturable in response to a predetermined pressure within said cylinder to allow the contents of said gas cylinder to escape, wherein said insert is cylindrical with a convex profile at first and second ends.

12. The assembly of claim 11, wherein said convex profile includes a first diameter at said inlet and tapers outward toward a second diameter at said first and second ends of said insert.

13. The assembly of claim 12, wherein said second diameter is sized in relation to a desired pressure force on said frangible member.

14. A relief valve assembly for a pressurized container comprising:
- a housing defining a cavity and an outlet;
- an insert having first and second ends and secured within said cavity by at least one barb, said insert including an inlet passage; and
- a frangible member held between said insert and said housing disposed between said inlet and outlet, rupturable in response to a predetermined pressure within said cylinder to allow the contents of said gas cylinder to escape, wherein said insert includes identical convex profiles on each of said first and second ends.

* * * * *